United States Patent
Hata

(10) Patent No.: US 9,025,820 B2
(45) Date of Patent: May 5, 2015

(54) IMAGE PROCESSING APPARATUS AND IMAGE PROCESSING METHOD

(71) Applicant: Canon Kabushiki Kaisha, Tokyo (JP)

(72) Inventor: Tetsuya Hata, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 142 days.

(21) Appl. No.: 13/712,161

(22) Filed: Dec. 12, 2012

(65) Prior Publication Data

US 2013/0177206 A1   Jul. 11, 2013

(30) Foreign Application Priority Data

Jan. 6, 2012 (JP) .................................. 2012-001584

(51) Int. Cl.
*G06K 9/00* (2006.01)
*H04N 5/232* (2006.01)
*H04N 9/07* (2006.01)
*H04N 9/73* (2006.01)
*H04N 9/68* (2006.01)

(52) U.S. Cl.
CPC ........ *G06K 9/00624* (2013.01); *H04N 5/23229* (2013.01); *H04N 9/07* (2013.01); *H04N 9/735* (2013.01); *H04N 9/68* (2013.01)

(58) Field of Classification Search
USPC .......... 382/103, 154, 165, 167, 278; 358/518, 358/520, 527
See application file for complete search history.

(56) References Cited

U.S. PATENT DOCUMENTS

| | | | | |
|---|---|---|---|---|
| 7,216,983 | B2* | 5/2007 | Hayashi | 351/211 |
| 7,342,609 | B2* | 3/2008 | Takizawa | 348/362 |
| 8,270,714 | B2* | 9/2012 | Stauder et al. | 382/167 |
| 8,369,967 | B2* | 2/2013 | Hoffberg et al. | 700/80 |
| 8,515,139 | B1* | 8/2013 | Nechyba et al. | 382/118 |
| 8,532,492 | B2* | 9/2013 | Palanisamy et al. | 398/115 |
| 8,583,263 | B2* | 11/2013 | Hoffberg et al. | 700/17 |
| 8,768,046 | B2* | 7/2014 | Ernst et al. | 382/154 |
| 8,836,768 | B1* | 9/2014 | Rafii et al. | 348/47 |

FOREIGN PATENT DOCUMENTS

JP     2000-259372     9/2000

* cited by examiner

*Primary Examiner* — Yosef Kassa

(74) *Attorney, Agent, or Firm* — Cowan, Liebowitz & Latman, P.C.

(57) ABSTRACT

An image processing apparatus includes: an image processing unit that executes image processing on an input image; a point light source detection unit that detects a point light source included in the input image; a scene determination unit that determines whether or not the input image shows a vivid scene based on a detection result of the point light source detection unit and an image signal of the input image; and a control unit that controls the image processing unit to change image processing for the input image in accordance with a determination result of the scene determination unit.

13 Claims, 8 Drawing Sheets

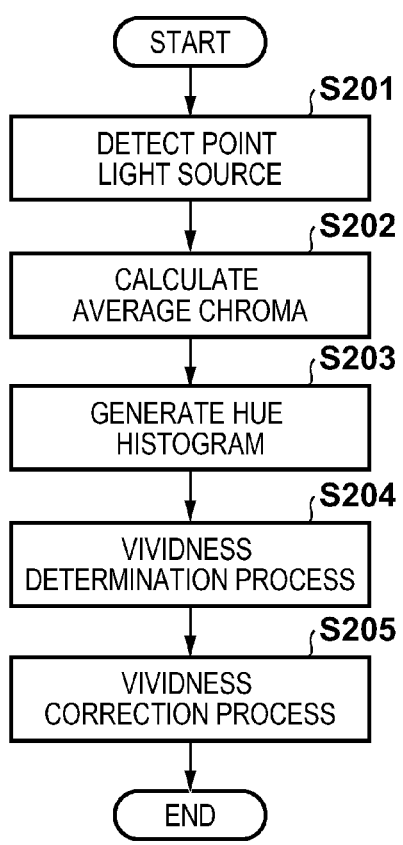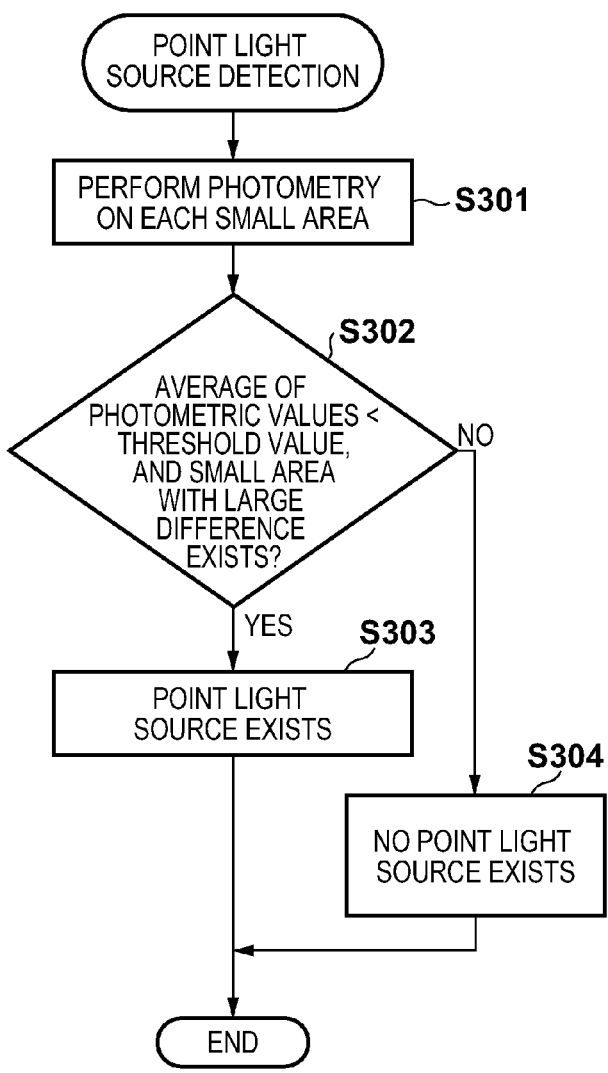

FIG. 8A
INPUT IMAGE

| f(i-1, j-1) | f(i, j-1) | f(i+1, j-1) |
|---|---|---|
| f(i-1, j) | f(i, j) | f(i+1, j) |
| f(i-1, j+1) | f(i, j+1) | f(i+1, j+1) |

FIG. 8B
FILTER

| a(-1, -1) | a(0, -1) | a(1, -1) |
|---|---|---|
| a(-1, 0) | a(0, 0) | a(1, 0) |
| a(-1, 1) | a(0, 1) | a(1, 1) |

FIG. 8C

| 1 | 2 | 1 |
|---|---|---|
| 0 | 0 | 0 |
| -1 | -2 | -1 |

FIG. 8D

| -1 | 0 | 1 |
|---|---|---|
| -2 | 0 | 2 |
| -1 | 0 | 1 |

FIG. 8E

| 0 | 1 | 2 |
|---|---|---|
| -1 | 0 | 1 |
| -2 | -1 | 0 |

FIG. 8F

| -2 | -1 | 0 |
|---|---|---|
| -1 | 0 | 1 |
| 0 | 1 | 2 |

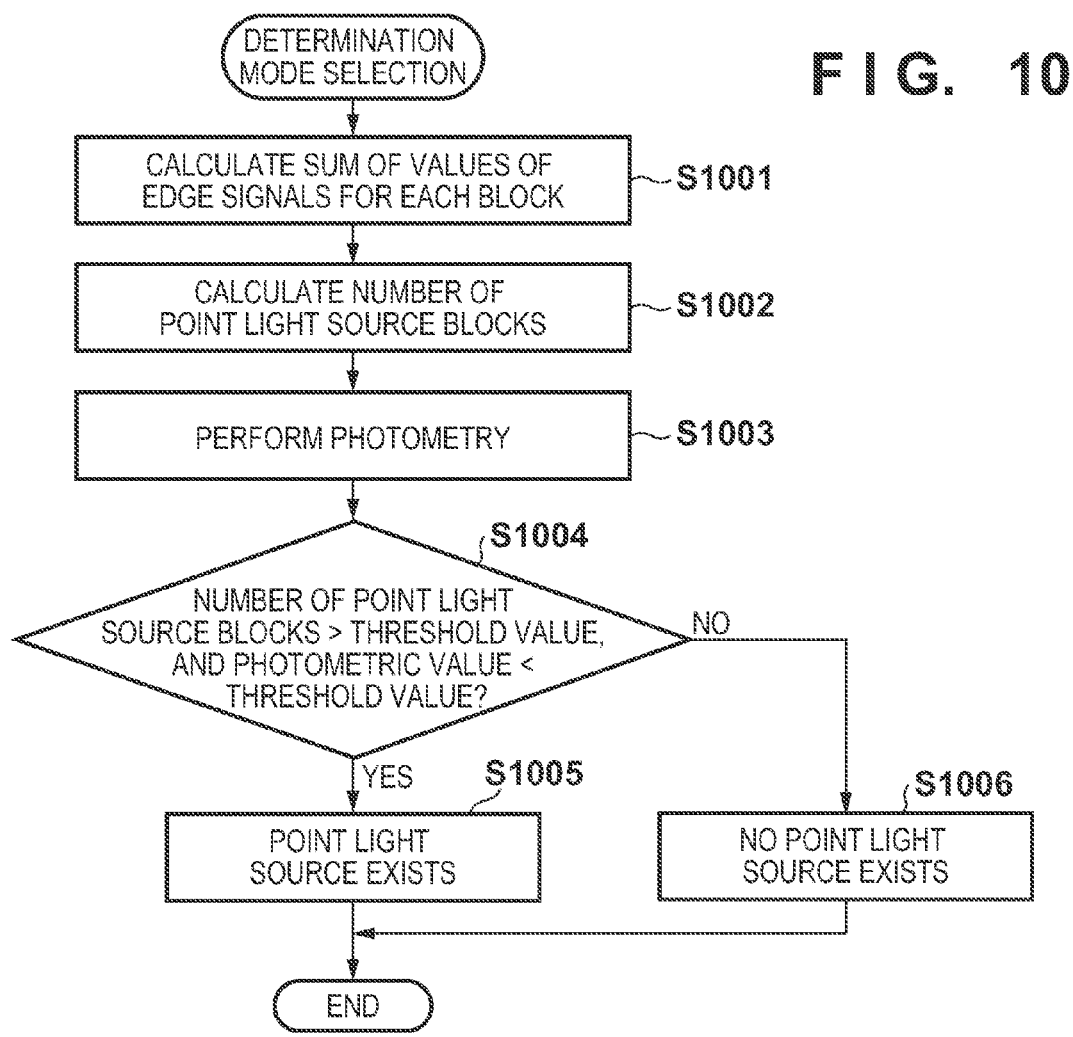
FIG. 10
FIG. 11A
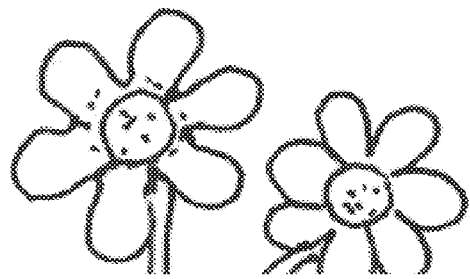
FIG. 11B
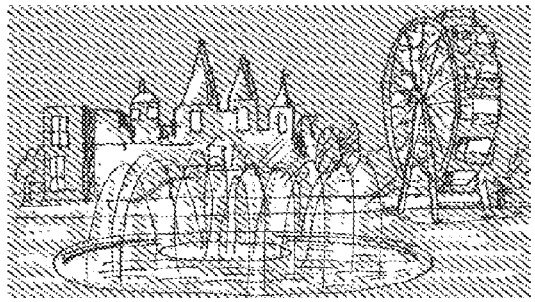

IMAGE PROCESSING APPARATUS AND IMAGE PROCESSING METHOD

BACKGROUND OF THE INVENTION

1. Field of the Invention

The present invention relates to an image processing apparatus that determines a scene of an input image and executes image processing in accordance with the determined scene.

2. Description of the Related Art

There are conventionally known image processing apparatuses that determine a scene of an image and a type of an object and execute image processing in accordance with the determined scene and the determined type of the object. For example, Japanese Patent Laid-Open No. 2000-259372 discloses an image output apparatus that determines whether or not input image data shows a vivid scene (object) and outputs an image showing a vivid scene at high resolution.

Conventional technology disclosed in the above Japanese Patent Laid-Open No. 2000-259372 determines whether or not input image data shows a vivid scene based on whether or not the number of pixels with high chroma is larger than a predetermined threshold value.

However, when a method is used whereby a scene is determined based only on the rate of pixels with high chroma, the result of the determination may not match the perception of a user (photographer). For example, compare a vivid scene of FIG. 11A captured in a well-lit location during daytime (normal vivid scene) with a scene of FIG. 11B showing a colorful and vivid night view with illuminations (night-view vivid scene). Although these are both scenes that are perceived by the user (photographer) as vivid, the rate at which pixels with high chroma occupy the image largely differs between these scenes. In the case of FIG. 11B, only regions with light sources have high chroma, and therefore the rate at which pixels with high chroma occupy the image is small compared to the case of FIG. 11A. Thus, with a conventional method whereby a scene is determined simply on the basis of color information of an image, it is not possible to appropriately determine whether or not an input image shows a vivid scene in line with human perception, both for a bright scene captured outdoors during daytime and for a dark scene showing a night view.

SUMMARY OF THE INVENTION

The present invention has been conceived in view of the above problem, and provides an image processing apparatus that allows appropriately determining whether or not an input image shows a vivid scene both for an object captured in a well-lit location and for an object in a night view.

An image processing apparatus pertaining to the present invention includes: an image processing unit that executes image processing on an input image; a point light source detection unit that detects a point light source included in the input image; a scene determination unit that determines whether or not the input image shows a vivid scene based on a detection result of the point light source detection unit and an image signal of the input image; and a control unit that controls the image processing unit to change image processing for the input image in accordance with a determination result of the scene determination unit.

Further features of the present invention will become apparent from the following description of exemplary embodiments with reference to the attached drawings.

BRIEF DESCRIPTION OF THE DRAWINGS

FIG. 2 is a flowchart of an overview of scene determination processing.

FIG. 3 is a flowchart of a point light source detection process pertaining to First Embodiment of the present invention.

FIGS. 8A to 8F show characteristics of edge detection processing executed by an edge detection unit.

FIG. 10 is a flowchart of a point light source detection process pertaining to Second Embodiment of the present invention.

FIGS. 11A and 11B show examples of an input image.

DESCRIPTION OF THE EMBODIMENTS

The following is a specific description of embodiments of the present invention with reference to the attached drawings.

First Embodiment

Figure 1:
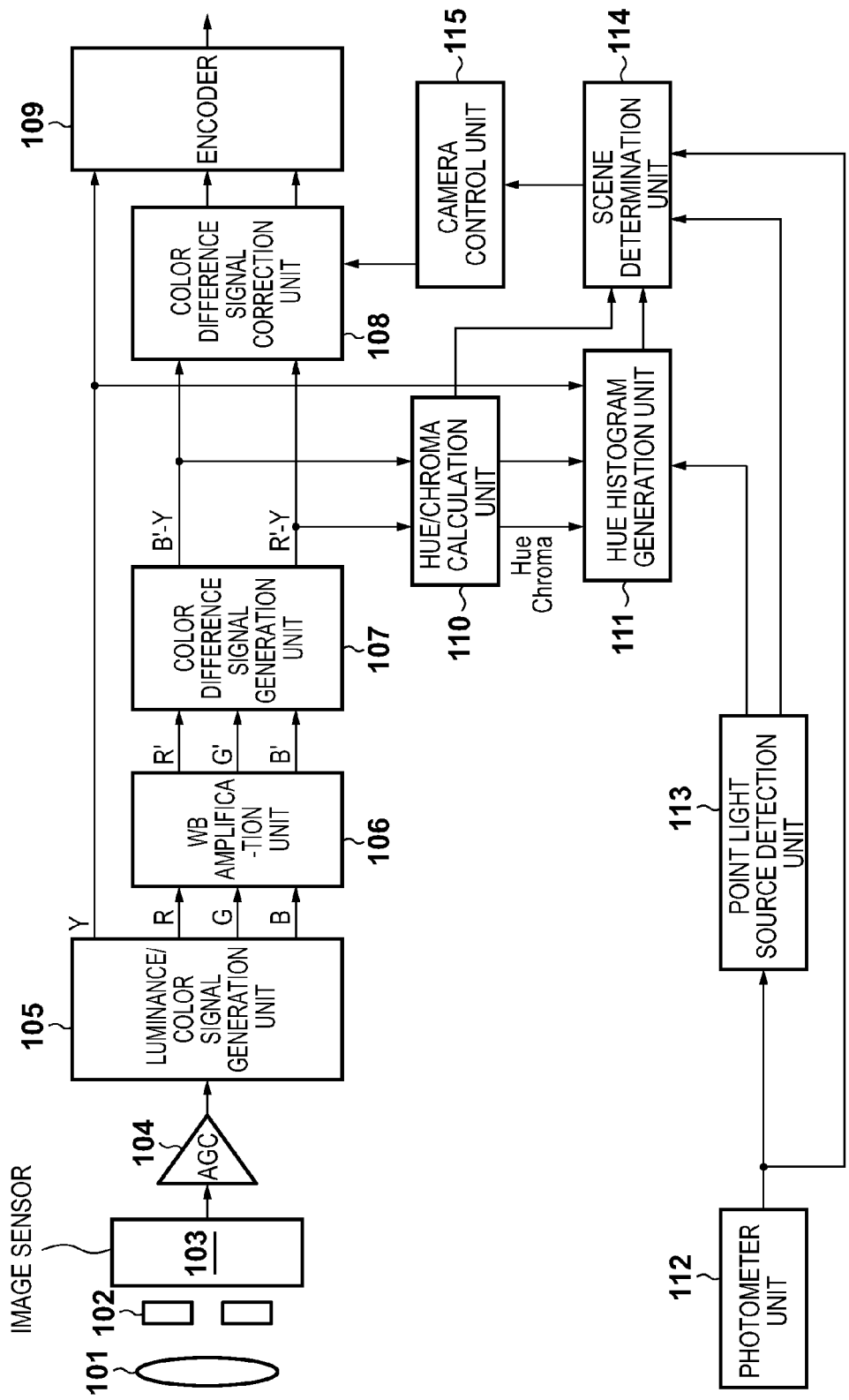
FIG. 1 is a block diagram showing a configuration of an imaging apparatus pertaining to First Embodiment of the present invention.

FIG. 1 is a block diagram showing a configuration of an imaging apparatus pertaining to First Embodiment of the present invention, which is one example of an image processing apparatus that has a function of determining a scene and executes image correction processing in accordance with the scene.

In FIG. 1, 101 denotes a lens that focuses luminous flux from an object, and 102 denotes a diaphragm that adjusts the amount of light when directing luminous flux from the lens to an image sensor. Furthermore, 103 denotes an image sensor that photoelectrically converts incident luminous flux and outputs the same as an image signal, and 104 denotes an automatic gain control (AGC) amplifier that amplifies the signal from the image sensor 103 to an appropriate level. Furthermore, 105 denotes a luminance/color signal generation unit that converts the signal generated by the image sensor 103 to a luminance signal (Y) and color signals (R, G, B). Furthermore, 106 denotes a white balance amplification unit that generates amplified color signals (R', G', B') by amplifying the color signals (R, G, B) output from the luminance/color signal generation unit 105 in accordance with a white balance gain. Furthermore, 107 denotes a color difference signal generation unit that generates color difference signals (R'−Y, B'−Y), 108 denotes a color difference signal correction unit that corrects the color difference signal by, for example, applying a gain to the color difference signals, and 109 denotes an encoder that converts signals to, for example, a standard television signal. Furthermore, 110 denotes a hue/chroma calculation unit that calculates a hue signal (Hue) and a chroma signal (Chroma) from the color difference signals (R'−Y, B'−Y). Note that the hue and chroma are calculated from the color difference signals using the following expressions.

$$\text{Hue} = \arctan((R'-Y)/(B'-Y))$$

$$\text{Chroma} = \sqrt{\{(R'-Y)^2 + (B'-Y)^2\}}$$

Furthermore, 111 denotes a hue histogram generation unit that generates a hue histogram from the hue, chroma and luminance signal, and 112 denotes a photometer unit that performs photometry on an image (captured scene) and outputs photometric values, which are evaluation values indicating the brightness of the captured scene. Furthermore, 113 denotes a point light source detection unit that detects point light sources included in the input image (captured scene), and 114 denotes a scene determination unit that determines whether or not the input image shows a vivid scene. Furthermore, 115 denotes a camera control unit that controls the entirety of the imaging system. Although not shown in the figures, the camera control unit 115 can cause constituent elements of the imaging apparatus to execute processing by transmitting instructions thereto.

A description is now given of the imaging operations of the imaging apparatus shown in FIG. 1. An image of the object that has been transmitted through the lens 101 and the diaphragm 102 is focused on the image sensor 103. Light incident on the image sensor 103 is photoelectrically converted, amplified to an appropriate level by the AGC amplifier 104, and then output to the luminance/color signal generation unit 105. The luminance/color signal generation unit 105 generates a luminance signal (Y) and color signals (R, G, B), outputs the luminance signal to the hue histogram generation unit 111 and the encoder 109, and outputs the color signals to the white balance amplification unit 106. The white balance amplification unit 106 amplifies the color signals (R, G, B) based on a white balance gain calculated by the camera control unit 115, and outputs the amplified color signals (R', G', B') to the color difference signal generation unit 107. The color difference signal generation unit 107 generates color difference signals (R'−Y, B'−Y) from the color signals (R', G', B'), and outputs the color difference signals to the color difference signal correction unit 108 and the hue/chroma calculation unit 110. The hue/chroma calculation unit 110 calculates the hue and chroma of each pixel based on the input color difference signals. The color difference signal correction unit 108 corrects the color difference signals (R'−Y, B'−Y) by applying a color difference gain calculated by the camera control unit 115 thereto. This color difference gain is determined by the camera control unit 115 based on the result of determination as to whether or not the input image data shows a vivid scene. A method for determining a scene and a method for determining a color difference gain will be explained later. The color difference signal correction unit 108 outputs the corrected color difference signals (R'−Y, B'−Y) to the encoder 109. The encoder 109 generates a standard television signal compliant with the NTSC and the like from the luminance signal (Y) and the color difference signals (R'−Y, B'−Y), and outputs the standard television signal to a display unit which is not shown in the figures. This concludes the general description of the imaging operations.

The following is a detailed description of the feature of the present embodiment, namely scene determination processing. FIG. 2 shows an overview of the scene determination processing. Processes of the steps are executed by the constituent elements of the imaging apparatus under control of the scene determination unit 114.

In step S201, the point light source detection unit 113 executes a point light source detection process. In step S202, the hue/chroma calculation unit 110 calculates the average chroma of the image and outputs the average chroma to the scene determination unit 114. In step S203, the hue histogram generation unit 111 generates a hue histogram and outputs the hue histogram to the scene determination unit 114.

In step S204, the scene determination unit 114 determines whether or not the current captured scene is a vivid scene based on the result of the point light source detection, the average chroma of the image, and the hue histogram. In step S205, a correction process is executed on the image data based on the result of the determination in step S204. This completes the processing.

Specifics of the processes of the steps are described below. First, a description is given of the point light source detection process executed by the point light source detection unit 113 in step S201 with reference to a flowchart of FIG. 3.

In step S301, the point light source detection unit 113 instructs the photometer unit 112 to perform photometry on an imaging region. The photometer unit 112 performs photometry on a plurality of small areas defined in the imaging region and outputs photometric values of the small areas to the point light source detection unit 113.

In step S302, the point light source detection unit 113 determines whether or not a point light source exists based on the input photometric values. More specifically, the point light source detection unit 113 compares the photometric values of the small areas with one another, and determines that a point light source has been detected when there is a small area that has a higher photometric value (luminance value) than the peripheral small areas and the average of the photometric values of the small areas is equal to or smaller than a predetermined threshold value. That is to say, a point light source detected in an input image denotes a light source that occupies a point in the image with a certain level of luminance, or a light source that occupies a region in the image with a certain level of luminance and that is not widely spread within the region.

When a point light source has been detected, the point light source detection unit 113 outputs information indicative of the detection of the point light source to the scene determination unit 114 (step S303). When the above condition is not satisfied, the point light source detection unit 113 outputs information indicative of no detection of the point light source to the scene determination unit 114 (step S304). This concludes the description of the flow of the point light source detection process in step S201 of FIG. 2.

Note that it is also possible to calculate the number of small areas that have a higher photometric value than the peripheral small areas when comparing the photometric values of the small areas with one another, and to determine that a point light source has been detected when the calculated number is equal to or greater than a predetermined threshold value. In other words, it is possible to determine whether or not there is a collection of point light sources as in night views and illuminations.

Next, a description is given of a method used by the hue/chroma calculation unit 110 to calculate the average chroma in step S202. A method for calculating the average chroma varies depending on the result of the point light source detection. That is to say, when a point light source has been detected, the average chroma is calculated from pixels whose luminance Y is higher than a predetermined threshold value (Th_Y) out of all pixels. On the other hand, when a point light source has not been detected, the average chroma is calculated through addition of the chromas of all pixels in the image data. Put another way, when a point light source has not been detected, the entire image is used. As opposed to this, when a point light source has been detected, only a region corresponding to the light source is used. The hue/chroma calculation unit 110 outputs the calculated average chroma to the scene determination unit 114.

Figure 4:
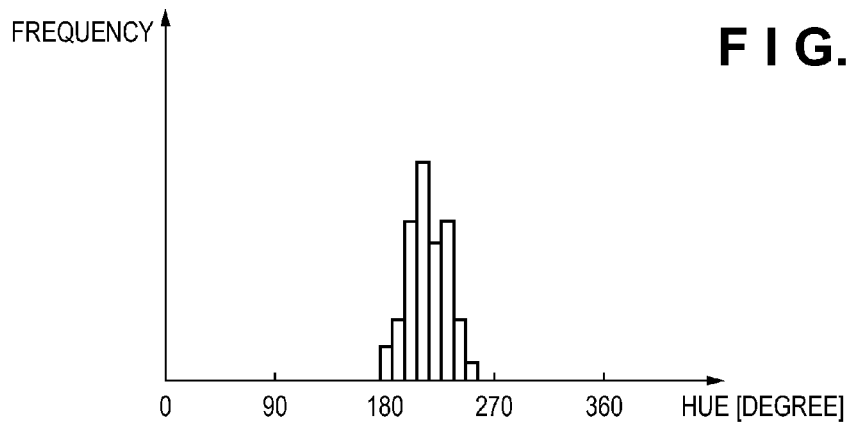
FIG. 4 shows an overview of a hue histogram.

Next, a description is given of the hue histogram generation process executed by the hue histogram generation unit 111 in step S203. FIG. 4 shows an example of a hue histogram. In FIG. 4, a horizontal axis (bins) represents hue, and the width of each bin is 10 (degrees). On the other hand, a vertical axis represents frequency and indicates the number of pixels with various hues.

As with the method for calculating the average chroma, a method for generating the hue histogram varies depending on the result of the point light source detection. More specifically, the hue histogram is generated as follows. When a point light source has been detected, the hue histogram generation unit 111 adds the frequency of the hue corresponding to an input pixel if the luminance Y of the input pixel is higher than the predetermined threshold value (Th_Y) and the chroma of the input pixel is higher than a predetermined threshold value (Th_Chroma). Conversely, if the pixel values of the input pixel do not satisfy the above conditions, the input pixel does not count toward the hue histogram.

On the other hand, when a point light source has not been detected, the hue histogram generation unit 111 adds the frequency of the hue corresponding to the input pixel if the chroma of the input pixel is higher than the predetermined threshold value (Th_Chroma). Conversely, if the pixel value of the input pixel does not satisfy the above condition, the input pixel does not count toward the hue histogram. In other words, when a point light source has not been detected, a part with chromatic color in the image is used. As opposed to this, when a point light source has been detected, only a region corresponding to a light source with chromatic color is used. The hue histogram generation unit 111 outputs information of the generated hue histogram to the scene determination unit 114.

As described above, by changing the methods for calculating the average chroma and the hue histogram in accordance with the result of the point light source detection, a scene can be determined under appropriate conditions, whether the scene shows a daytime view or a night view.

Figure 5:
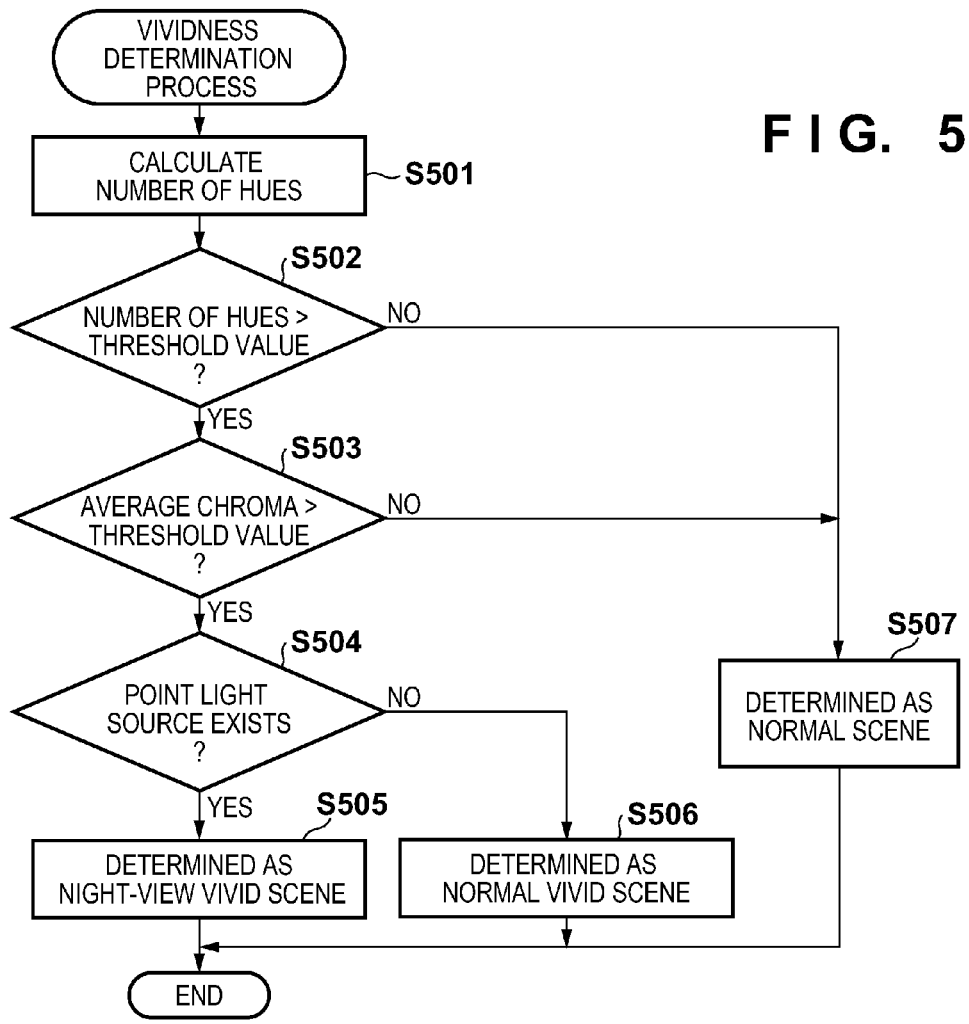
FIG. 5 is a flowchart of a process executed by a scene determination unit pertaining to First Embodiment of the present invention.

The following describes a vividness determination process executed by the scene determination unit 114 in step S204 with reference to a flowchart of FIG. 5.

In step S501, the scene determination unit 114 calculates the number of hues, which is the index showing the breadth of distribution of hues in the image data. To be more specific, with respect to the input hue histogram, the scene determination unit 114 calculates the number of bins (hues) whose frequency is not zero as the number of hues.

In step S502, the scene determination unit 114 compares the calculated number of hues with a predetermined determination threshold value (Th_Hue). When the number of hues is greater than the set determination threshold value, the scene determination unit 114 proceeds to step S503. When the number of hues is equal to or smaller than the set determination threshold value, the scene determination unit 114 proceeds to step S507. It should be noted here that the determination threshold value is Th_Hue (point light source) when a point light source has been detected, and Th_Hue (normal) when a point light source has not been detected. These determination threshold values are set so that the following relationship holds: Th_Hue (point light source)<Th_Hue (Normal).

In step S503, the scene determination unit 114 compares the input average chroma with a predetermined determination threshold value (Th_AveChroma). When the input average chroma is higher than the set determination threshold value, the scene determination unit 114 proceeds to step S504. When the input average chroma is equal to or smaller than the set determination threshold value, the scene determination unit 114 proceeds to step S507. It should be noted here that the determination threshold value is Th_AveChroma (point light source) when a point light source has been detected, and Th_AveChroma (normal) when a point light source has not been detected. These determination threshold values are set so that the following relationship holds: Th_AveChroma (point light source)<Th_AveChroma (normal).

Figure 6:
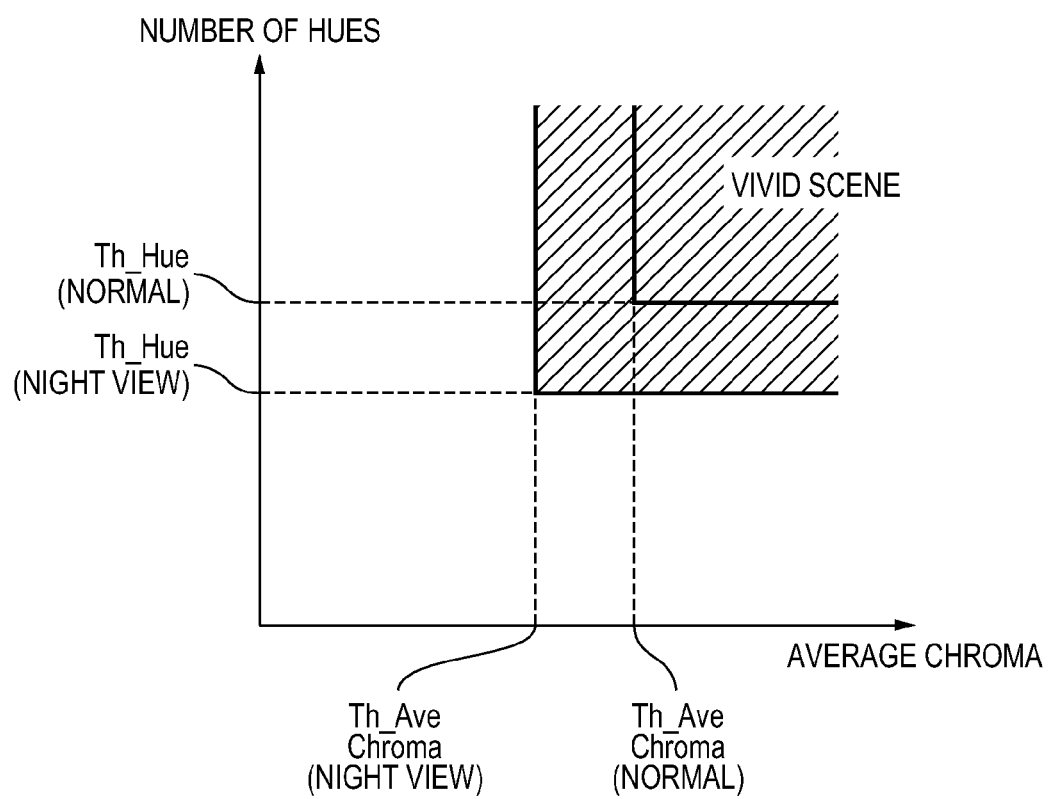
FIG. 6 shows characteristics of scene determination processing executed by a scene determination unit.

FIG. 6 shows an overview of the determination threshold values set in the above-described manner. In FIG. 6, a horizontal axis represents the average chroma and a vertical axis represents the number of hues. In a portion with hatching in FIG. 6, i.e. when the number of hues and the average chroma are both equal to or greater/higher than the corresponding threshold values, the current captured scene is determined as a vivid scene. The reason why the determination threshold values vary depending on the result of the point light source detection as shown in FIG. 6 is because a light source with chromatic color on a dark background is perceived as more vivid than an object with chromatic color in a well-lit location, even if they exhibit the same chroma/hue distribution.

In step S504, the scene determination unit 114 determines whether or not a point light source has been detected. When a point light source has been detected, the scene determination unit 114 proceeds to step S505 and outputs, to the camera control unit 115, determination result information showing that the result of the scene determination is a night-view vivid scene. When a point light source has not been detected, the scene determination unit 114 proceeds to step S506 and outputs, to the camera control unit 115, determination result information showing that the result of the scene determination is a normal vivid scene.

In step S507, the scene determination unit 114 outputs, to the camera control unit 115, determination result information showing that the result of the scene determination is a normal scene. This concludes the description of the flow of the vividness determination process.

A description is now given of the details of a vividness correction process in step S203 of FIG. 2. The camera control unit 115 controls a parameter of the color difference signal correction unit 108 based on the scene determination result information from the scene determination unit 114. In the present embodiment, the camera control unit 115 controls a color difference gain G of the color difference signal correction unit 108. The color difference gain G, which serves as the parameter, comes in three types: G1, G2 and G3. Here, the following relationship holds: G1>G2>G3≥1. G1, G2 and G3 are set as a color difference gain when the result of the scene determination is a normal vivid scene, a night-view vivid scene and a normal scene, respectively. That is to say, in the case of a vivid scene, it is corrected to an image with emphasized chroma by further increasing the gain applied to the color difference signals. On the other hand, in the case of a night-view vivid scene, setting the color difference gain too high makes noise noticeable, and therefore the color difference gain is set low compared to the case of a normal vivid scene.

As described above, the present embodiment detects whether or not a point light source exists in a captured scene and controls the determination regarding a vivid scene based on the result of the detection. More specifically, when a point light source exists, the present embodiment performs control to determine a scene using only a region corresponding to the point light source and sets the scene determination threshold values low. This enables execution of scene determination processing appropriate for the captured scene, whether the captured scene is a night-view vivid scene showing colorful and vivid illuminations or a normal vivid scene showing outdoor flowers.

The above embodiment has described an example in which the generation of the hue histogram is controlled such that only pixels with high luminance count toward the hue histogram. However, the present invention may use any other method that determines whether or not a region corresponding to a light source shows a vivid scene. For example, the present invention may use a method for generating a chroma histogram with chromas represented as bins and a luminance histogram with luminances represented as bins in addition to the hue histogram. In this case, it suffices to determine that a part with a light source is a vivid scene when the chroma histogram shows distribution of bins (chromas) at or above a predetermined threshold value and the luminance histogram shows distribution of bins (luminances) at or above a predetermined threshold value. This makes it possible to simplify the process of generating the hue histogram.

Although the above embodiment has described the case where the input image is corrected through control on the gain intensity for the color difference signals, the present invention may adopt any other control that corrects the input image in accordance with the result of the scene determination. For example, when applying the gain to the color difference signals, the gain intensity may be controlled in accordance with the luminance of each pixel in addition to the result of the scene determination. More specifically, when the result of the scene determination is a night-view vivid scene, the color difference gain may be applied only to pixels with high luminance out of all pixels. Furthermore, control may be performed to increase the gain intensity for pixels with higher luminance. Moreover, when the result of the scene determination is a night-view vivid scene, control may be performed to correct the luminance signal so as to further lower the luminance of dark parts of the input image. In this way, a colorful and vivid night view can be corrected while maintaining its colorfulness and vividness, and the noise can be suppressed at the same time.

Although the above embodiment has described the case where a scene is determined based on an image signal of an input image corresponding to one frame, the present invention may adopt any other method that determines a captured scene based on an input image signal. For example, in the case where a plurality of frame images are input in succession, such as when a video is taken, the average value of pixel values of the plurality of frame images may be calculated and used for the scene determination. In this way, features of a scene can be appropriately grasped even if the scene changes over time as in a scene showing flashing illuminations.

Second Embodiment

The following describes the case where a region in which a point light source exists in an image is determined and used for control on scene determination as Second Embodiment of the present invention.

Figure 7:
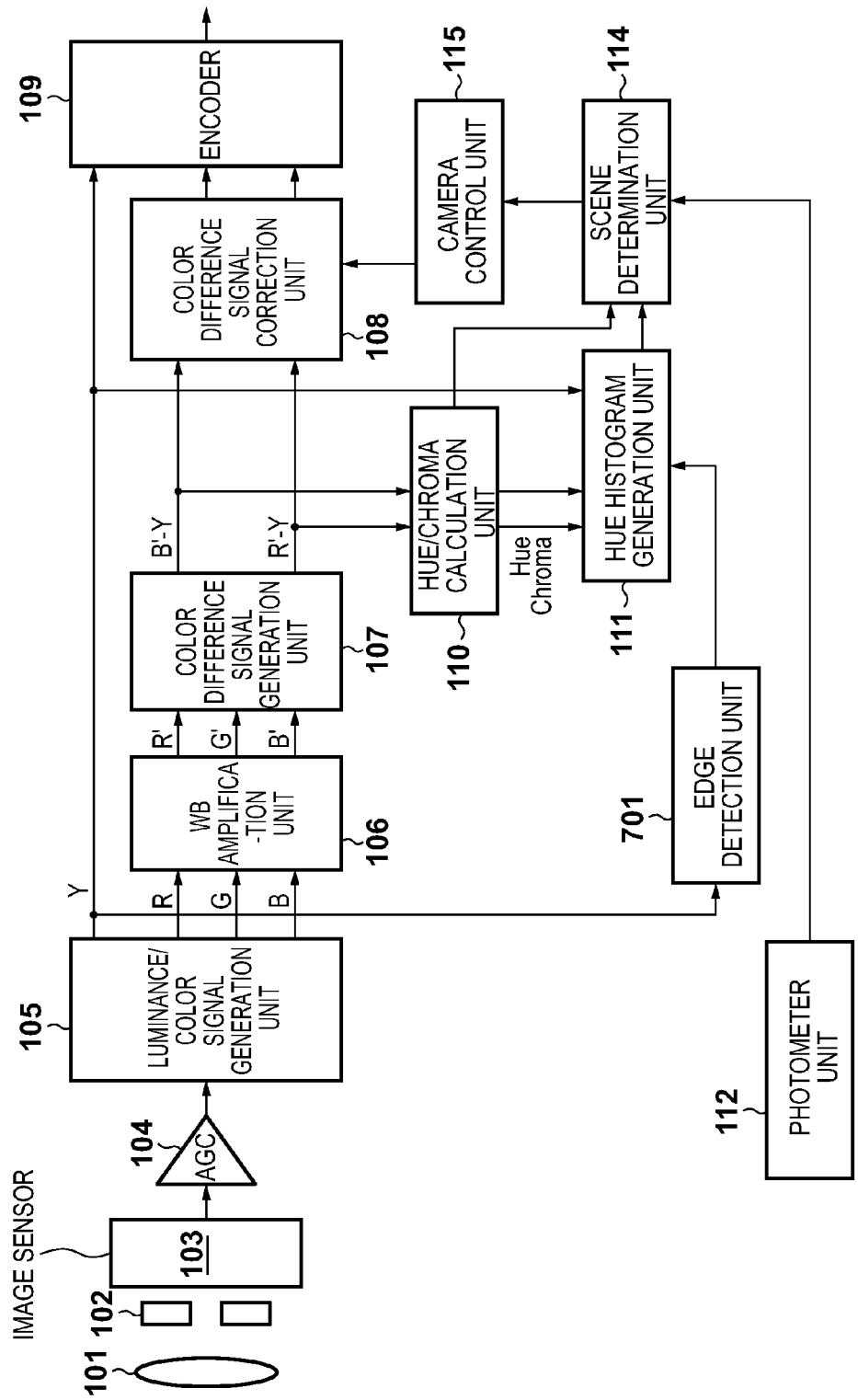
FIG. 7 is a block diagram showing a configuration of an imaging apparatus pertaining to Second Embodiment of the present invention.

FIG. 7 shows a main configuration of an imaging apparatus pertaining to the present embodiment. Below, constituent elements that are similar to constituent elements shown in FIG. 1 are given the same reference signs thereas, and a specific description thereof is omitted. In the present embodiment, an edge detection unit 701 that detects edges in an image is newly added. The edge detection unit 701 is used for detecting a point light source and determining a region where the detected point light source exists.

A description is now given of the operations of the edge detection unit 701 for detecting edges in an image. When the luminance signal Y is input, the edge detection unit 701 extracts edge components in the image by applying a bandpass filter and an edge detection filter (3×3 pixels) to the luminance signal Y.

A description of the edge detection filter is given below with reference to FIGS. 8A to 8F. In FIGS. 8A to 8B, FIG. 8A shows an input image f(i, j). FIG. 8B shows a filter applied to an input image f(x, y). A new pixel f'(x, y) generated through filter processing can be calculated using the following expression.

$$f'(x, y) = \sum_{l=1}^{1} \sum_{k=-1}^{1} f(i+k, j+l)a(k, l)$$

In the above manner, the edge detection unit 701 generates an image signal with edges extracted from the image. Note that edge components along the height, width and diagonal directions can be extracted by changing the above filter coefficient. FIGS. 8C to 8F show examples of the filter coefficient used for detecting edges along various directions. FIG. 8C shows an example of a vertical edge (line along the width direction) detection filter. FIG. 8D shows an example of a horizontal edge (line along the height direction) detection filter. FIG. 8E shows an example of a diagonal (diagonally down-right line) detection filter. FIG. 8F shows an example of a diagonal (diagonally up-right line) detection filter. The following describes the case where edges are extracted using the detection filter shown in FIG. 8C.

Figure 9A:
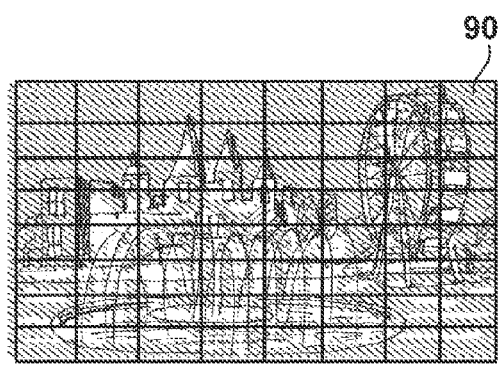
FIGS. 9A to 9D show examples of division of an image into blocks.
Figure 9B:
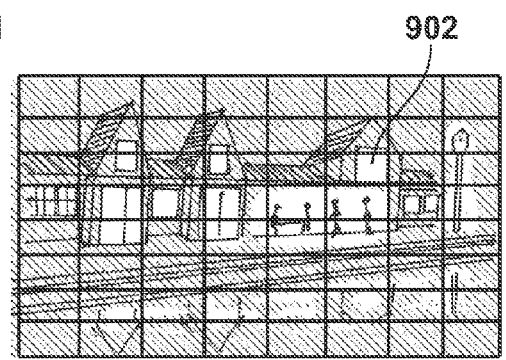
Figure 9C:
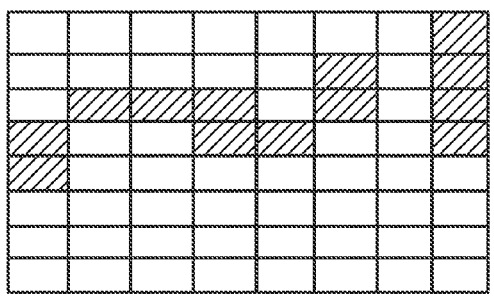
Figure 9D:
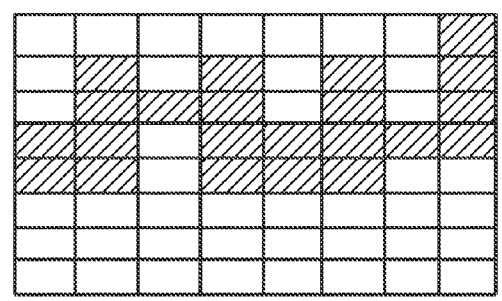

Next, the edge detection unit 701 divides the generated image signal into blocks (8×8 blocks) as shown in FIGS. 9A and 9B, and calculates the sum of values of edge signals on a per-block basis. In the case where the captured scene shows a night view or illuminations, the sum of values of edge signals has a large value at a boundary between a light source and a background. Therefore, in the case of the scenes shown in FIGS. 9A and 9B, the sum of values of edge signals has a large value in blocks with hatching in FIGS. 9C and 9D. In the above manner, by extracting the edge signals, a point light source can be detected and a region where a point light source exists can be determined.

Note that the detection of a point light source through extraction of edge signals may be used in combination with the detection of a point light source using the photometry result obtained by the photometer unit 112 explained in First Embodiment. To be more specific, when a point light source has been detected through photometry performed by the photometer unit 112, a region where that point light source exists may be identified using the point light source detection through extraction of edge signals.

Furthermore, it is possible to execute processing for distinguishing between a point light source such as 901 in FIG. 9A and a light source (surface light source) that occupies a large area such as 902 in FIG. 9B. They can be distinguished from each other by detecting edge lines along various directions when extracting edges. This is because a divided block that includes a point light source such as 901 in FIG. 9A exhibits characteristics of edge lines along various directions (e.g. the height direction, the width direction, the diagonally up-right direction, and the diagonally down-right direction). On the other hand, a block that includes a surface light source such as 902 strongly exhibits characteristics of edge lines detected along one direction (in this case, a line along the height direction).

More specifically, edge signals corresponding to lines along the height direction, the width direction, the diagonally up-right direction and the diagonally down-right direction are extracted using the four types of edge extraction filters shown in FIGS. 8C to 8F, and the sum of the values of the edge signals is calculated for each direction on a per-block basis. A block in which the sum of the values of the edge signals has exceeded a predetermined threshold value for a plurality of directions is determined as a block including a point light source. Furthermore, a block in which the sum of the values of the edge signals has exceeded a predetermined threshold value for one direction is determined as a block including a surface light source, and a block in which the sum of the values of the edge signals has not exceeded a predetermined threshold value for any direction is determined as a block that does not include a light source. This concludes the description of the point light source detection process executed by the edge detection unit 701.

A description is now given of a flow of scene determination processing pertaining to the present embodiment. An overview of the scene determination processing is similar to the case of First Embodiment shown in FIG. 2. The point light source detection process pertaining to the present embodiment is described below with reference to a flowchart of FIG. 10.

In step S1001, the edge detection unit 701 generates edge signals of the input image and calculates the sum of the values of the edge signals on a per-block basis. In step S1002, the edge detection unit 701 calculates the number of point light source blocks using the sums of the values of the edge signals. More specifically, the edge detection unit 701 considers blocks in which the calculated sum of the values of the edge signals is equal to or greater than a predetermined threshold value (Th_Edge) as point light source blocks that represent regions where a point light source exists, and calculates the number of these blocks. The edge detection unit 701 outputs the calculated number of the point light source blocks and information showing their positions in the image to the scene determination unit 114. Note that when edges are extracted with distinction between point light source blocks and surface light source blocks, only the blocks that have been categorized as point light source blocks are used, and the blocks that have been categorized as surface light source blocks are not used. This is because light sources that are categorized as surface light sources are often associated with objects that the user (photographer) does not wish to be captured vividly, such as sign boards and neon signs of stores.

In step S1003, the photometer unit 112 performs photometry, calculates a photometric value, and outputs the photometric value to the scene determination unit 114. In step S1004, the scene determination unit 114 determines whether or not a point light source exists. More specifically, the scene determination unit 114 determines that a point light source has been detected when the number of the point light source blocks is equal to or greater than a predetermined threshold value and the photometric value is equal to or smaller than a predetermined threshold value (step S1005). The scene determination unit 114 determines that no point light source has been detected when the above conditions are not satisfied (step S1006).

The following describes a method used by the hue/chroma calculation unit 110 to calculate the average chroma in step S202. As in the case of First Embodiment, when a point light source has been detected, the average chroma is calculated using only a region corresponding to the point light source. However, a method for determining the region corresponding to the point light source differs from the case of First Embodiment. More specifically, the determination is made as follows. When a point light source has been detected, the average chroma is calculated using only pixels in a point light source block out of all pixels. On the other hand, when a point light source has not been detected, the average chroma is calculated through addition of the chromas of all pixels in the image data. The hue/chroma calculation unit 110 executes the above process based on position information of each pixel in the image data and position information of a region that has been determined as a point light source block by the edge detection unit 701.

Next, a description is given of a method used by the hue histogram generation unit 111 to generate the hue histogram in step S203. Unlike the case of First Embodiment, information of the position of a point light source block is used as with the calculation of the average chroma. That is to say, when a point light source has been detected, the frequency of the hue corresponding to an input pixel is added if the position of the input pixel is in a point light source block and the chroma of the input pixel is higher than a predetermined threshold value (Th_Chroma). Conversely, if the pixel values of the input pixel do not satisfy the above conditions, the input pixel does not count toward the hue histogram.

On the other hand, when a point light source has not been detected, the frequency of the hue corresponding to an input pixel is added if the chroma of the input pixel is higher than the predetermined threshold value (Th_Chroma). Conversely, if the pixel value of the input pixel does not satisfy the above condition, the input pixel does not count toward the hue histogram. The details of the processes in steps S204 and S205 are similar to the case of First Embodiment, and therefore a specific description thereof is omitted.

In the above-described embodiments, an image processing apparatus that determines whether or not a captured scene is vivid controls the vivid scene determination processing based on the result of detection of a point light source. More specifically, under control of the image processing apparatus, the detection of a point light source and the determination of a region where the point light source exists are performed through extraction of edge signals, and if the point light source exists, a scene is determined using only the region corresponding to the point light source. This makes it possible to further improve the accuracy of determining whether or not a point light source in a night view and illuminations is vivid.

Although the above embodiments have described an example in which the input image is corrected through control on the gain intensity for the color difference signals, the present invention may adopt any other control that corrects the input image in accordance with the result of the scene determination. For example, the present invention may perform control to increase the gain intensity for the color difference signals only with respect to pixels in a block that has been determined to include a point light source upon edge detection. Furthermore, the intensity of the color difference gain may be controlled in accordance with the area of a region corresponding to a light source in consideration of the fact that noise becomes noticeable if the intense color difference gain is applied to a region corresponding to a light source that occupies a large area (surface light source). That is to say, the intensity of the color difference gain to be applied may be lowered for a block that has been determined to include a surface light source upon edge detection than for a block that has been determined to include a point light source.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-001584 filed Jan. 6, 2012, which is hereby incorporated by reference herein in its entirety.

What is claimed is:

1. An image processing apparatus comprising:
an image processing unit that executes image processing on an input image;
a point light source detection unit that detects a point light source included in the input image;
a scene determination unit that determines whether or not the input image shows a vivid scene based on a detection result of the point light source detection unit and an image signal of the input image; and
a control unit that controls the image processing unit to change image processing for the input image in accordance with a determination result of the scene determination unit,
wherein the point light source detection unit divides the input image into a plurality of small areas, compares photometric values of the small areas with one another, and determines that a point light source has been detected in a case where any of the small areas has a higher photometric value than peripheral small areas and an average of the photometric values of the small areas is smaller than a predetermined threshold value.

2. The image processing apparatus according to claim 1, wherein
the point light source detection unit detects whether or not the input image includes a point light source using at least one of a photometry result obtained with respect to a captured scene, a luminance signal of the input image, and an edge signal extracted from the input image.

3. The image processing apparatus according to claim 1, wherein
when the point light source detection unit has detected a point light source, the scene determination unit determines whether or not a region corresponding to the point light source in the input image shows a vivid scene.

4. The image processing apparatus according to claim 3, wherein
the region corresponding to the point light source is a region composed of pixels that have a luminance value equal to or greater than a predetermined threshold value in the input image.

5. The image processing apparatus according to claim 3, wherein
the point light source detection unit determines whether or not each small area includes a point light source.

6. The image processing apparatus according to claim 1, wherein
the scene determination unit determines that the input image shows a vivid scene when chroma of the input image is higher than a predetermined scene determination threshold value, and sets the scene determination threshold value low when the point light source detection unit has detected a point light source.

7. The image processing apparatus according to claim 1, wherein
the point light source detection unit outputs information on a degree to which the point light source detected from the input image occupies the input image, and the scene determination unit determines whether or not the input image shows a vivid scene based on the information on the degree.

8. The image processing apparatus according to claim 1, wherein
when the point light source detection unit has detected a point light source, the image processing unit changes image processing to be applied between a region that corresponds to the point light source and a region that does not correspond to the point light source in the input image.

9. An image processing apparatus comprising:
an image processing unit that executes image processing on an input image;
a point light source detection unit that detects a point light source included in the input image;
a scene determination unit that determines whether or not the input image shows a vivid scene based on a detection result of the point light source detection unit and an image signal of the input image; and
a control unit that controls the image processing unit to change image processing for the input image in accordance with a determination result of the scene determination unit,
wherein the point light source detection unit divides the input image into a plurality of small areas,
calculates the number of small areas that have a higher photometric value than peripheral small areas based on photometric values of the small areas, and determines that a point light source has been detected when the calculated number is equal to or greater than a predetermined threshold value.

10. An image processing method comprising:
an image processing step of executing image processing on an input image;
a point light source detection step of detecting a point light source included in the input image;
a scene determination step of determining whether or not the input image shows a vivid scene based on a detection result of the point light source detection step and an image signal of the input image; and
a control step of controlling the image processing unit to change image processing for the input image in accordance with a determination result of the scene determination step,
wherein in the point light source detection step, dividing the input image into a plurality of small areas, comparing photometric values of the small areas with one another, and determining that a point light source has been detected in a case where any of the small areas has a higher photometric value than peripheral small areas and an average of the photometric values of the small areas is smaller than a predetermined threshold value.

11. An image processing method comprising:
an image processing step of executing image processing on an input image;
a point light source detection step of detecting a point light source included in the input image;
a scene determination step of determining whether or not the input image shows a vivid scene based on a detection result of the point light source detection step and an image signal of the input image; and a control step of controlling the image processing unit to change image processing for the input image in accordance with a determination result of the scene determination step, wherein in the point light source detection step, dividing the input image into a plurality of small areas, calculating the number of small areas that have a higher photometric value than peripheral small areas based on photometric values of the small areas, and determining that a point light source has been detected when the calculated number is equal to or greater than a predetermined threshold value.

12. An image processing apparatus comprising:

an image processing unit that executes image processing on an input image;

a point light source detection unit that detects a point light source included in the input image;

a scene determination unit that determines whether or not the input image shows a vivid scene based on a detection result of the point light source detection unit and an image signal of the input image; and a control unit that controls the image processing unit to change image processing for the input image in accordance with a determination result of the scene determination unit, wherein the point light source detection unit divides the input image into a plurality of small areas and determines that a point light source has been detected based on the number of the small areas in which an evaluate value of photometric values is higher than that of peripheral small areas.

13. An image processing method comprising:

an image processing step of executing image processing on an input image;

a point light source detection step of detecting a point light source included in the input image;

a scene determination step of determining whether or not the input image shows a vivid scene based on a detection result of the point light source detection step and an image signal of the input image; and a control step of controlling the image processing unit to change image processing for the input image in accordance with a determination result of the scene determination step, wherein in the point light source detection step, dividing the input image into a plurality of small areas and determining that a point light source has been detected based on the number of the small areas in which an evaluate value of photometric values is higher than that of peripheral small areas.

* * * * *